United States Patent [19]

Brandt et al.

[11] Patent Number: 4,638,058

[45] Date of Patent: Jan. 20, 1987

[54] ETHERS OF BETA-CYCLODEXTRIN AND A PROCESS FOR THEIR PREPARATION

[75] Inventors: Lothar Brandt, Wiesbaden; Utz-Hellmuth Felcht, Bad Soden-Neuenhain, both of Fed. Rep. of Germany

[73] Assignee: Hoechst Aktiengesellschaft, Fed. Rep. of Germany

[21] Appl. No.: 682,413

[22] Filed: Dec. 14, 1984

[30] Foreign Application Priority Data

Dec. 17, 1983 [DE] Fed. Rep. of Germany ....... 3345779

[51] Int. Cl.$^4$ .............................................. C08B 37/16
[52] U.S. Cl. ...................................... 536/103; 536/46
[58] Field of Search .................................. 536/46, 103

[56] References Cited

U.S. PATENT DOCUMENTS

| | | | |
|---|---|---|---|
| 3,426,011 | 2/1969 | Parmerter et al. | 536/103 |
| 3,453,257 | 7/1969 | Parmerter et al. | 536/46 |
| 3,453,258 | 7/1969 | Parmerter et al. | 536/46 |
| 3,459,731 | 8/1969 | Gramera et al. | 536/103 |

FOREIGN PATENT DOCUMENTS

| | | |
|---|---|---|
| 1493047 | 1/1973 | Fed. Rep. of Germany . |
| 2704776 | 8/1977 | Fed. Rep. of Germany . |
| 6883/79 | 1/1979 | Fed. Rep. of Germany . |
| 3118218 | 4/1982 | Fed. Rep. of Germany . |
| 3130502 | 6/1982 | Fed. Rep. of Germany . |
| 1204376 | 1/1960 | France . |
| 1548917 | 12/1968 | France . |
| 57-47301 | 3/1982 | Japan . |
| 58-173102 | 10/1983 | Japan ................... 536/103 |
| 58-210901 | 12/1983 | Japan ................... 536/46 |
| 895429 | 5/1962 | United Kingdom . |

OTHER PUBLICATIONS

Saenger, "Cyclodextrin-Einschlussverbindungen in Forschung und Industrie", Angew. Chem. 92, 343–361 (Verlag Chemie, Weinheim, DE, 1980); p. 354 is pertinent.

Croft and Bartsch, "Synthesis of Chemically Modified Cyclodextrins", Tetrahedron vol. 39, No. 9, pp. 1417 to 1474 (Pergamon Press, GB, 1983); pp. 1427 to 1434.

Casu et al., "Conformation of O-methylated Amylose and Cyclodextrins", Tetrahedron vol. 24, pp. 803 to 821 (Pergamon Press, GB, 1968), pp. 803 to 813.

Bergeron et al., "Complex Formation between Myrobacterial Polysaccharides or Cyclodextrins and Palmitoyl Coenzyme-A", J. Biological Chemistry vol. 250, No. 4, pp. 1223 to 1230 (1975).

Weidenhoff et al., "Properties of Cyclodextrins, Part III, Cyclodextrin-Epichlorhydrin Resins: Preparation and Analysis", Die Stärke, 21st year, No. 5, pp. 119 to 123 (1969); pp. 120–122.

Lammers et al., "Properties of Cyclodextrins, Part VI, Water Soluble Cyclodextrin-Derivatives, Preparation and Analysis", Die Stärke, 23rd yr, No. 5, pp. 167 to 171 (1971).

Takeo et al., "Synthesis of Heptakis (2-O-methyl)-β-Cyclodextrin", Die Stärke, 28th yr, No. 7, pp. 226, 227, (1976).

Szeijtle et al., "Synthesis and $^{13}$C-NMR Spectroscopy of Methylated β-Cyclodextrins", Starch/Stärke, 32rd yr, No. 5, pp. 165 to 169 (1980).

Szejtle et al., "Method for the Preparation of Tablets which Rapidly Disintegrate in an Aqueous Medium", published PCT application No. WO83/00809.

Chemical Abstracts, vol. 101, No. 16, Oct. 15, 1984, 101:132888j.

*Primary Examiner*—Ronald W. Griffin
*Attorney, Agent, or Firm*—Berman, Aisenberg & Platt

[57] ABSTRACT

The novel water-soluble compounds are the ethyl ether and the N,N-dialkyl($C_1$ to $C_4$)aminoethyl ethers of β-cyclodextrin (β-CD).

The process for the preparation of these ethers is performed by reacting β-CD with an etherifying agent in a basic liquid reaction medium. The reaction medium contains an alkali-metal hydroxide, water and at least one water-miscible organic solvent (for example, dimethoxyethane or isopropanol).

16 Claims, No Drawings

ETHERS OF BETA-CYCLODEXTRIN AND A PROCESS FOR THEIR PREPARATION

RELATED APPLICATION

This application is related to a concurrently-filed application Ser. No. 682,414, now U.S. Pat. No. 4,582,900), the entire disclosure of which is incorporated herein by reference.

FIELD OF THE INVENTION

The present invention relates to a new class of compounds, ethers of β-cyclodextrin, and to a process for their preparation.

BACKGROUND

β-Cyclodextrin (β-CD) is a cyclic oligosaccharide consisting of 7 glucose units which are joined by α-1,4 linkages:

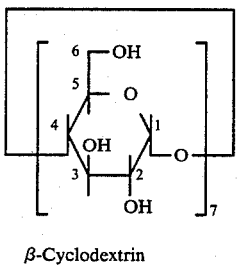

β-Cyclodextrin

It is obtained as a result of an enzymatic degradation of starch, during which a predominant amount of β-CD is formed, apart from α-cyclodextrin (composed of 6 glucose units) and γ-cyclodextrin (composed of 8 glucose units). As far as the chemical and physical-chemical properties of this class of compounds are concerned, reference is made to "Cyclodextrin-Einschlussverbindungen in Forschung und Industrie" (Cyclodextrin inclusion compounds in Research and Industry) [I] by W. Saenger, published in Angew. Chemie, 92, pp. 343 to 361 (1980), Verlag Chemie-Weinheim (DE) and to "Synthesis of Chemically Modified Cyclodextrins" [II] by A. P. Croft and R. A. Bartsch, published in Tetrahedron, Vol. 39, No. 9, pp. 1417 to 1474 (1983), Pergamon Press (GB). For the etherification reaction, a maximum of 3 OH groups are available per anhydro-D-glucose unit in the β-cyclodextrin, i.e., the maximum number of OH groups per β-cyclodextrin molecule is 21. Since known ethers of β-cyclodextrin have primarily been synthesized as structurally well-defined compounds, they are generally ethers where one, two or the three OH groups of the carbon atoms 2, 3, and 6 of each anhydro-D-glucose unit are deliberately substituted; the degree of substitution (DS) of these compounds is then 1, 2 or 3. In principle, any intermediate degree is also possible, if the etherification proceeds in a statistical manner to give mixtures of compounds. Substitution of one OH group in the β-cyclodextrin molecule results in an ether group (a DS of about 0.14). When there is such a low degree of etherification, some molecules are not etherified at all, whereas others are substituted at two or more OH groups. For practical purposes it is therefore reasonable to assume that at a DS of 0.3 or higher at least one OH group of each molecule is actually substituted.

The following ethers of β-cyclodextrin are known from prior art:
In the first of the cited references [I] (p. 354), the methyl, sodium carboxymethyl and dihydroxypropyl ethers of β-cyclodextrin are specifically mentioned; methods for their preparation are not described.

Apart from various methyl ethers of β-cyclodextrin, the second of the cited publications [II] specifically mentions and describes the preparation of ethers which (at their carbon atoms 2 and 6) possess benzyl, allyl or vinyl groups and (at their carbon atoms 3) possess methyl groups; furthermore carboxymethyl and carboxyethyl ethers, cyanoethyl and sulfoethyl ethers are described (in particular on pages 1427 et seq.) The last-mentioned compounds are also described in U.S. Pat. No. 3,453,258 and in U.S. Pat. No. 3,426,011. The latter of these two patents provides a process variant (for the preparation of carboxymethyl ethers of β-cyclodextrin) in which etherification is performed in the presence of an organic solvent (isopropanol) and an aqueous NaOH solution.

Hydroxyethyl and hydroxypropyl ethers and also a hydroxyethyl-hydroxypropyl mixed ether of β-CD are referred to by U.S. Pat. No. 3,459,731.

In "Conformation of O-methylated Amylose and Cyclodextrins" [III], in Tetrahedron, Vol. 24, pp. 803 to 821 (1968), Pergamon Press, B. Casu et al. describe a) methyl-β-CD (DS about 2) which is disubstituted at the carbon atoms 2 and 6 and is obtained by reacting β-CD with dimethyl sulfate in a dimethylformamide (DMF)/dimethyl sulfoxide (DMSO) mixture, in the presence of BaO, and b) trisubstituted methyl-β-CD (DS about 3), which is obtained by reacting β-CD with methyl iodide in DMSO, in the presence of BaO.

In "Complex Formation between Mycobacterial Polysaccharides or Cyclodextrins and Palmitoyl Coenzyme A" [IV], published in The Journal of Biological Chemistry, Vol. 250, No. 4, pp. 1223 to 1230 (1975), R. Bergeron et al. describe a) C-2 and C-6 disubstituted methyl β-CD and propyl-β-CD which are produced by reacting β-CD with dimethyl sulfate or dipropyl sulfate, respectively, in a DMF/DMSO mixture, in the presence of BaO and Ba(OH)$_2$; b) C-3 or C-6 monosubstituted methyl-β-CD (DS about 1 or about 0.7), which are produced by reacting β-CD provided with protective groups with methyl iodide or diazo methane; and c) trisubstituted methyl-β-CD which is produced by reacting disubstituted methyl-β-CD with methyl iodide in a DMF/DMSO mixture in the presence of sodium hydride.

In "Properties of Cyclodextrins/Part III/Cyclodextrin-Epichlorohydrin Resins: Preparation and Analysis" [IV], published in Die Stärke (Starch), 21st year, No. 5, pp. 119 to 123 (1969), N. Wiedenhof et al. describe the preparation of β-CD epichlorohydrin polymer beads and the corresponding water-soluble resins by reacting β-CD with the bifunctionally reactive epichlorohydrin in methyl isobutyl ketone, in the presence of an aqueous 30% or 16% strength NaOH solution and NaBH$_4$.

In "Properties of Cyclodextrins/Part VI/Water-Soluble Cyclodextrin-Derivatives, Preparation and Analysis" [IV], published in Die Stärke, 23rd year, No. 5, pp. 167 to 171 (1971), J. Lammers et al. describe the preparation of a) sodium carboxymethyl-β-CD (DS about 0.45) by reacting β-CD with monochloroacetic acid in a 30% strength aqueous NaOH solution, in the presence of NaBH$_4$, and b) sodium sulfopropyl-β-CD (DS about 0.9) by reacting β-CD with propanesultone in a 40% strength aqueous NaOH solution.

In "Synthesis of Heptakis (2-O-methyl-β-cyclodextrin" [VII], published in Die Stärke, 28th year, No. 7, pp. 226/227 (1976), K. Takeo et al. describe the preparation of methyl-β-CD which is only substituted at the carbon atom 2 (DS about 1) and is obtained by methylating the C-6 brominated β-CD with dimethylsulfate in DMF, in the presence of BaO and Ba(OH)$_2 \times$8H$_2$O, and splitting off the bromine substituent.

In "Synthesis and $^{13}$C-NMR Spectroscopy of Methylated β-Cyclodextrins" [VIII], published in "Starch/Stärke", 32nd year, No. 5, pp. 165 to 169 (1980), J. Szejtli et al. describe the preparation of a) the trisubstituted methyl-β-CD by reacting β-CD with methyl iodide in dry DMSO or DMF, in the presence of sodium hydride, and b) C-2 and C-6 disubstituted methyl-β-CD by reacting β-CD with dimethyl sulfate in a mixture of DMSO and DMF, in the presence of BaO and Ba(OH)$_2 \times$8H$_2$O.

JP-A 6883/79 describes liquid crystal elements which contain, for example, derivatives of β-CD as a cyclic oligosaccharide, whereby, in accordance with the general formula indicated in that publication, a great number of different hydroxyalkyl ethers or aminoalkyl ethers are said to be possible. The only derivative of β-CD specifically mentioned in the specification is hydroxypropyl-β-CD. DE-A No. 27 04 776 relates to similar subject matter, but in that patent publication, too, only hydroxypropyl-β-CD is specifically mentioned.

WO-A 83/00809 refers to the use of swellable β-cyclodextrin derivatives in tablets, whereby the derivatives are obtained from β-CD by reacting it with bifunctionally-reactive compounds, such as epichlorohydrin, in an aqueous-alkaline medium. The preparation of this type of derivative is also known from DE-B No. 14 93 047 or, with the addition of cellulose, from DE-A No. 31 30 502.

The water-soluble inclusion complexes according to DE-A No. 31 18 218 are formed from methyl-β-CD and biologically-active organic compounds (for example, vitamins or steroid hormones) and are said to contain a "partially methylated β-cyclodextrin", i.e., a molecule in which at least one and not more than 20 hydroxyl groups are etherified (DS about 0.14 to about 2.86). The methyl-β-CD types are said to consist either of homogeneous molecules or of mixtures of molecules of different degrees of substitution, preference being given to a methyl-β-CD which (on an average) is disubstituted, i.e., has a DS of about 2. As far as the preparation of the derivatives is concerned, the publication refers to the previously-mentioned references.

In the recent past β-cyclodextrin has gained more and more in importance because processes have apparently been developed which permit cost-advantageous production on a large industrial scale.

SUMMARY OF THE INVENTION

It is the object of the instant invention to synthesize previously-unknown ethers and to provide a cost-advantageous process for their production.

The invention is based on water-soluble ethers of β-cyclodextrin which, in accordance with the invention, are characterized by an ethyl or an N,N-dialkyl(C$_1$ to C$_4$)-aminoethyl group as an ether substituent. The object of the invention is furthermore accomplished by providing a process for preparing these ethers. The process of the invention is characterized by reacting β-cyclodextrin with an etherifying agent in a basic liquid reaction medium containing an alkali-metal hydroxide, water and at least one water-miscible organic solvent. Under certain circumstances it is also possible to omit the organic solvent.

DETAILS

The term "water-soluble" herein means that, at room temperature (about 20° C.), the process product is water-soluble to at least 10% by weight, in particular to at least 15% by weight, i.e., at least this percentage of the product is contained in a saturated solution. The preferred organic solvents include dialk(C$_1$ to C$_3$)-oxyethanes, dialkyl(C$_1$ to C$_3$)glycols, C$_2$ to C$_5$ alkanols, (C$_1$ to C$_4$)alkoxy(C$_2$ or C$_3$)alkanols and aliphatic ketones, in particular dimethoxyethane, isopropanol, tert. butanol, acetone and/or methylethyl ketone. These organic solvents, which are employed alone or in a mixture of two or more, are present in the etherifying mixture apart from water.

The process of this invention is performed in one of the known aggregates (for example, stirring tub). When the temperature level of the reaction mixture is higher than the boiling point of the mixture of organic solvent/H$_2$O, it is advisable to carry out the process according to the invention in pressure apparatus; it is also customary to carry out the reaction in a pressure apparatus when reactants, which are already in a gaseous state under normal conditions (standard pressure, room temperature), are used.

The alkali-metal hydroxide employed is usually NaOH (KOH and LiOH are optional alternatives) in solid form or in dissolved form, e.g., as an aqueous alkali-metal hydroxide solution, such as a 10 to 50% (by weight) strength solution. From 1 to 30 parts by weight of organic solvent are preferably used per 1 part by weight of β-CD, and the alkali-metal hydroxide is generally employed in an amount of from 2.5 to 35 moles, particularly of from 5 to 30 moles, per 1 mole of β-CD. The proportion of water in the reaction mixture is advantageously within a range of from 3 to 50%, relative to the weight of the liquid mixture of organic solvent/water. The reaction is preferably conducted with ethyl chloride, diethyl sulfate or 1-N,N-dialkyl(C$_1$ to C$_4$)amino-2-chloroethane as the etherifying agent. The proportion of etherifying agent, which (under the given conditions) is only monofunctionally reactive, usually amounts to from 2 to 50 moles, particularly 5 to 40 moles, per 1 mole of β-CD.

The ethers formed in the etherifying reaction, which (within the scope of this invention) are exclusively ethers possessing one single type of substituent, are novel and particularly include the ethyl ethers, N,N-dimethylaminoethyl ethers and N,N-dimethylaminoethyl ethers; the degree of substitution (DS) of these compounds varies between about 0.3 to 3.0, and the products are composed of mixtures of molecules having different degrees of substitution, which means that the degree of substitution is a statistical average value and the products are amorphous.

For conducting the process in accordance with the present invention, it is expedient to mix β-CD with a mixture of organic solvent, water and alkali-metal hydroxide first and then to add the etherifying agent in one or several steps. The reaction mixture is optionally flushed with inert gas, such as nitrogen, in order to prevent oxidative side reactions. The etherifying reaction is particularly successfully conducted at temperatures between 30° C. and 130° C., depending on the reactivity of the employed etherifying agent. The time required for the etherifying reaction generally varies between 20 minutes and 8 hours, depending on the reaction temperature. In an initial separating step (for example filtration, distillation or extraction) the crude product is first freed from the bulk of salts formed (as by-product). It is freed from liquid components after adding precipitating agents or changing the temperature and preferably after adding acid until unconsumed bases have been neutralized. It is then optionally subjected to further purification and drying (for example, dialysis, ion-exchange desalination, lyophilizing).

The ethers of β-cyclodextrin, which are prepared in accordance with the process of this invention, are employed in known fields of application, for example, for the production of inclusion compounds.

In the Examples which follow, parts by weight are related to parts by volume as kg to $dm^3$; percentages relate to weight. "DS" designates the degree of substitution, i.e., the average number of substituted OH groups per anhydro-D-glucose unit.

EXAMPLE 1

1 part by weight of β-CD (commercially available as a 97% strength product) is suspended in 3 parts by volume of dimethoxyethane, and 2.13 parts by weight of an aqueous 45% strength NaOH solution are stirred in with thorough mixing. The mixture is heated to 120° C. for 4 hours in an autoclave stirrer after adding 2.25 parts by weight of ethyl chloride. After cooling down the mixture and neutralizing small amounts of residual alkali with aqueous hydrochloric acid, the volatile organic substances are removed by distillation. The remaining solution is diluted with water to twice its original volume, filtered and desalinated by means of an ion-exchange combination (basic-acidic). The desalinated solution is lyophilized. Ethyl-β-CD having an average DS of 0.8 is thus produced. The product is optionally dissolved in water to obtain a 10% aqueous solution without residue.

EXMPLE 2

1 part by weight of β-CD is suspended in 2.5 parts by volume of acetone and mixed with 2.6 parts by weight of a 50% strength aqueous solution of N,N-dimethylaminoethylchloride-hydrochloride. Then 1.5 parts by weight of a 50% strength aqueous NaOH solution are added, and the mixture is stirred for 3 hours at a temperature of 50° C. Acetone is distilled off, and the remaining solution is dialyzed against water to remove sodium chloride and by-products. The resulting solution of the basic β-CD-ether is adjusted to a pH of 4 with hydrochloric acid and lyophilized. The hydrochloride of N,N-dimethylaminoethyl-β-CD, having an average DS of 0.46, is thus obtained.

What is claimed is:

1. A mixture of water-soluble ethers of β-cyclodextrin having different degrees of substitution and wherein each substituent is the same and is either ethyl or an N,N-dialkyl($C_1$ to $C_4$)amino ethyl group.

2. A mixture of water-soluble ethers according to claim 1 having a statistical average degree of substitution between about 0.3 and 1.0 and wherein each ether substituent is ethyl.

3. A mixture of water-soluble ethers according to claim 1 having a statistical average degree of substitution between about 0.3 and 3.0 and wherein each ether substituent is an N,N-dialkyl($C_1$ to $C_4$)aminoethyl group.

4. A process for preparing a mixture of ethers as claimed in claim 1, which comprises reacting β-cyclodextrin with an etherifying agent in a basic liquid reaction medium containing an alkali-metal hydroxide, water and at least one water-miscible organic solvent.

5. A process as claimed in claim 4 wherein the organic solvent comprises at least one member selected from the group consisting of a dialk($C_1$ to $C_3$)oxyethane, a $C_2$ to $C_5$ alkanol, a ($C_1$ to $C_4$) alkoxy($C_2$ or $C_3$)alkanol and an aliphatic ketone.

6. A process as claimed in claim 5 wherein the organic solvent comprises a dialk($C_1$ to $C_3$)oxyethane.

7. A process as claimed in claim 5 wherein the organic solvent comprises a $C_2$ to $C_5$ alkanol.

8. A process as claimed in claim 5 wherein the organic solvent comprises an aliphatic ketone.

9. A process as claimed in claim 5 where the organic solvent comprises a ($C_1$ to $C_4$) alkoxy($C_2$ to $C_3$)alkanol.

10. A process as claimed in claim 4 wherein the etherifying agent is only monofunctionally reactive.

11. A process as claimed in claim 4 wherein the etherifying agent is ethyl chloride.

12. A process as claimed in claim 4 wherein the etherifying agent is a 1-2-chloroethane.

13. A mixture of water-soluble ethers according to claim 1 wherein each ether substituent is an N,N-dialkyl($C_1$ to $C_4$)aminoethyl group.

14. A mixture of water-soluble ethers according to claim 13 wherein each ether substituent is N,N-dimethylaminoethyl.

15. A mixture of water-soluble ethers according to claim 13 wherein each ether substituent is N,N-diethylaminoethyl.

16. A mixture of water-soluble ethers according to claim 1 which is amorphous and wherein each ether substituent is ethyl.

* * * * *

UNITED STATES PATENT AND TRADEMARK OFFICE
CERTIFICATE OF CORRECTION

PATENT NO. : 4,638,058
DATED : January 20, 1987
INVENTOR(S) : BRANDT et al.

It is certified that error appears in the above-identified patent and that said Letters Patent are hereby corrected as shown below:

Column 6, Claim 12, line 2, "1-2-chloroethane" should read
--1-[N,N-dialkyl($C_1$ to $C_4$)-amino]-2-chloroethane--.

Signed and Sealed this

Twenty-second Day of September, 1987

Attest:

DONALD J. QUIGG

Attesting Officer    Commissioner of Patents and Trademarks